United States Patent [19]

Gross et al.

[11] Patent Number: 5,283,735

[45] Date of Patent: * Feb. 1, 1994

[54] FEEDBACK SYSTEM FOR LOAD BEARING SURFACE

[75] Inventors: Clifford M. Gross, Roslyn; Jose Banaag, Middle Village; Ravi Goonetilleke; Chandra Nair, both of Dix Hills, all of N.Y.

[73] Assignee: Biomechanics Corporation of America, Melville, N.Y.

[*] Notice: The portion of the term of this patent subsequent to Dec. 8, 2009 has been disclaimed.

[21] Appl. No.: 986,094

[22] Filed: Dec. 4, 1992

Related U.S. Application Data

[63] Continuation of Ser. No. 623,220, Dec. 6, 1990, Pat. No. 5,170,364.

[51] Int. Cl.$^5$ .............................................. A61B 5/103
[52] U.S. Cl. .................................... 364/413.02; 5/616; 5/935; 128/774; 297/284.1; 364/558
[58] Field of Search ....................... 364/413.02, 551.01, 364/550, 554, 558, 578; 297/283, 284 A, 284 B, 284 E, 284 R, 284.1, 284.2, 284.3, 284.6, 284.7; 5/600, 611–616, 621, 449, 453, 455, 935; 128/774, 33, 34, 44

[56] References Cited

U.S. PATENT DOCUMENTS

| | | | |
|---|---|---|---|
| 3,982,786 | 9/1976 | Burgin et al. | 297/284 E |
| 4,583,305 | 4/1986 | Miyamoto . | |
| 4,634,083 | 1/1987 | McKinnon | 297/284 R X |
| 4,634,179 | 1/1987 | Hashimoto et al. | 297/284 E |
| 4,730,403 | 3/1988 | Walkhoff . | |
| 4,797,962 | 1/1989 | Goode | 5/453 |
| 4,833,614 | 5/1989 | Saitoh et al. | 297/284 E |
| 4,890,235 | 12/1989 | Reger et al. | 364/579 X |
| 4,969,684 | 11/1990 | Zarotti | 297/284 B X |
| 4,999,932 | 3/1991 | Grim . | |
| 5,170,364 | 12/1992 | Gross et al. | 364/558 |

FOREIGN PATENT DOCUMENTS

| | | |
|---|---|---|
| 0136247 | 4/1985 | European Pat. Off. . |
| 2542268 | 5/1978 | Fed. Rep. of Germany . |
| 2922619 | 12/1980 | Fed. Rep. of Germany . |
| 3804960 | 8/1989 | Fed. Rep. of Germany . |

Primary Examiner—Jack B. Harvey
Assistant Examiner—Edward Pipala
Attorney, Agent, or Firm—Meltzer, Lippe, Goldstein,

[57] ABSTRACT

An electronic system for adjusting a load bearing surface such as a chair or bed to provide a desired level of comfort includes an array of pressure sensors located within the load bearing surface. The pressure sensors generate data indicating the actual distribution of pressure exerted by a user on the load bearing surface. An electronic processor processes the data generated by the array of pressure senors. The processor compares the fraction of total load exerted on each of a plurality of regions of the load bearing surface with a desired range for each region. If the fraction of total load for any region is not within the desired range, a servo-mechanism is activated to change the shape of the load bearing surface so that the fraction of total load on each region is within the desired range, so as to provide a desired level of comfort to the user.

1 Claim, 5 Drawing Sheets

FEEDBACK SYSTEM FOR LOAD BEARING SURFACE

This is a continuation of application Ser. No. 07/623,220, filed Dec. 6, 1990, now U.S. Pat. No. 5,170,364.

RELATED APPLICATION

A patent application entitled "Method and Apparatus for Evaluating a Load Bearing Surface" filed for Clifford M. Gross on Apr. 18, 1990, bearing Ser. No. 07/510,653, and assigned to the assignee hereof contains subject matter related to the subject matter of the present application. The above-identified related application is incorporated herein by reference.

FIELD OF THE INVENTION

The present invention relates to a feedback system for controlling in real time the shape of a load bearing surface such as a seat or bed to provide a desired level of comfort for a user.

BACKGROUND OF THE INVENTION

The above-identified patent application describes a system for measuring the pressure distribution on a load bearing surface such as a seat or bed. The system of the above-identified patent application comprises a two-dimensional array of pressure sensors located within the load bearing surface and a processor for processing the data generated by the pressure sensors. Using the data generated by the pressure sensors it is possible for the processor to evaluate certain attributes of the pressure distribution on the load bearing surface. For example, it is possible to divide the load bearing surface into regions and to determine the fraction of the total load on each region, the mean and median pressure of the various regions, and the pressure gradients between regions.

By testing many different seats with many different human users, it is possible to statistically correlate subjective comfort sensations of the user with certain attributes of the objectively measured pressure distributions exerted on the seats by the users. For example, a seat pan may be divided into eight regions: left thigh, right thigh, left buttock, right buttock, two left bolsters and two right bolsters. Similarly, a seat back may be divided into eight regions: left bolster, right bolster, three lumbar regions and three thoracic regions. It is possible to statistically correlate the fraction of the total load on the seat which is exerted on each of these regions with a user's comfort.

In this manner, it is possible to determine for each seat region a desired range for the fraction of the total load which is exerted on a region. A seat may then be objectively classified as comfortable for a user if the actual distribution of the load exerted by the user on the seat is such that the load fraction in each region falls into the corresponding desired range.

Other attributes of the pressure distribution besides fraction of total load exerted on a region may also be statistically correlated with comfort. For example, small pressure gradients correlate with high comfort levels and large pressure gradients correlate with low comfort levels. One reason for this is that small gradient values indicate that the load is more evenly distributed over a greater surface area of a seat.

It is an object of the present invention to utilize the above-described correlation between certain pressure distribution attributes and comfort to provide an electronic feedback system for automatically reconfiguring a load bearing surface such as a seat or bed to provide a user with a certain desired level of comfort.

SUMMARY OF THE INVENTION

The present invention is directed to an electronic feedback system for adjusting a load bearing surface such as a seat or bed to provide a desired level of comfort for a user. In an illustrative embodiment, a two-dimensional array of pressure sensors generates data indicating the actual distribution of pressure exerted by the user on the load bearing surface. The data generated by the array of pressure sensors is processed by an electronic processor.

In an illustrative embodiment of the invention, the electronic processor determines, from the data generated by the pressure sensor array, the fraction of the total load exerted on each of a plurality of regions of the load bearing surface. The processor also compares the fraction of total load on each region of the load bearing surface with a predetermined range. In the case of a load bearing device such as a seat, it is known that the seat is comfortable when the fraction of total load exerted on each of a plurality of regions is within a certain range.

When the fraction of total load exerted on one or more of the regions of the load bearing surface is not within the corresponding desired range, the electronic processor activates a servo-mechanism which alters the shape of the load bearing surface to redistribute the pressure in such a way so as to bring the fraction of total load on each region into the desired range.

This feedback system operates continuously and in real time. However, to avoid having the load bearing surface reconfigure itself for each small movement of the user, time averages of the load fraction exerted on each region of the load bearing surface are illustratively calculated and utilized by the processor to control the servo-mechanism. In this way the feedback system responds to larger longer term movements of the user rather than responding to every single small movement of the user.

In an alternative embodiment of the invention, instead of comparing the actual load fraction exerted on each region with a range of desired values, other attributes of the actual pressure distribution on a load bearing surface may be utilized to determine if a seat or other load bearing surface is comfortable to a user. These other attributes include pressure gradients, mean pressures, median pressures, and the standard deviation of pressures in particular regions of a load bearing surface.

To change the shape of the load bearing surface, a plurality of air bladders may be located within the surface. In this case, the processor controls the amount of air in the individual bladders to regulate the shape of the load bearing surface. Alternatively, a plurality of plates may be located within the surface and the positions of the plates are changed under the control of the processor to change the shape of the load bearing surface.

In short, the present invention provides a highly ergonomic interface between a user and a load bearing surface such as a vehicle seat, office seat or bed.

DETAILED DESCRIPTION OF THE INVENTION

Figure 1:
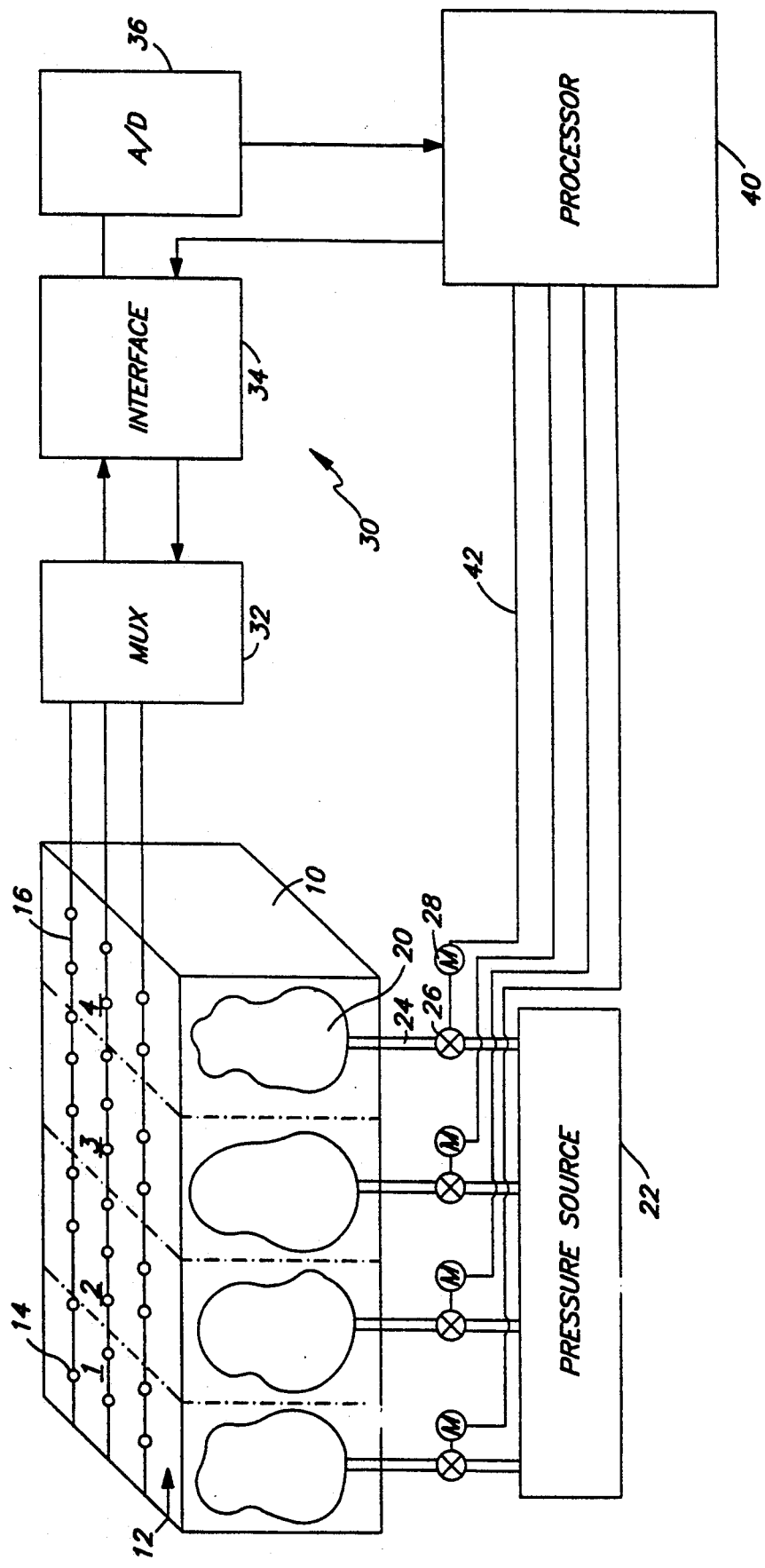
FIG. 1 schematically illustrates a feedback system for reconfiguring a load bearing surface in accordance with an illustrative embodiment of the present invention.

FIG. 1 schematically illustrates a load bearing device 10. Although the load bearing device 10 is shown in FIG. 1 as being in the form of a rectangular solid, this geometry is intended to be illustrative only and the load bearing device 10 is intended to represent a seat, such as a vehicle or office seat, or a bed, for example. The load bearing device 10 includes a load bearing upper surface 12 which supports a load in the form of all or part of a human being.

Located within and just beneath the surface 12 is a two-dimensional array of pressure sensors 14. Illustratively, each of the pressure sensors 14 is a Force Sensing Resistor available from Interlink Electronics, Santa Barbara, Calif. These devices are polymer thick film devices which exhibit a decreasing resistance when an increasing force is applied in a direction normal to the device surface. The sensors are arranged in strips 16 and connected so as to form a voltage divider network.

The load bearing surface 12 is divided into a plurality of regions 1, 2, 3, 4. Associated with each region 1, 2, 3, and 4 is a subset of the pressure sensors 14. In some embodiments of the invention, the different regions may overlap so that some of the sensors belong to more than one region.

Located within the load bearing device 10 are a plurality of air bladders 20. In a preferred embodiment of the invention, there are one or more air bladders associated with each of the regions 1, 2, 3, 4 of the load bearing surface. Each of the air bladders 20 is connected to a source 22 of a pressure medium such as air by way of a conduit 24. A valve 26 is located in each conduit 24 to control the flow of air into and out of the associated bladder 20. Each valve 26 is controlled by a servomechanism illustratively in the form of a motor 28. By controlling the amount of air in each of the bladders 20, it is possible to control the shape of the load bearing surface 12 of the load bearing device 10.

The present invention includes a feedback system 30 for changing the shape of the load bearing surface 12 to provide a desired level of comfort for a human being supported by the load bearing surface. In FIG. 1, the feedback system 30 includes the multiplexer 32, the interface 34, the analog-to-digital converter 36, and the processor 40. The multiplexer 40 connects a signal from any one of the pressure sensors 14 to the interface 34. The sequence in which the pressure sensors are to be interrogated are transmitted from the processor 40 to the interface 34. Analog signals from the multiplexer are transmitted through the interface unit to the analog-to-digital converter 36 wherein the signals from the pressure sensors are converted to digital form and transmitted to the processor 40 which stores these signal values in memory.

Thus, when there is a load in the form of a human being on the load bearing surface 12, the processor 40 receives from the array of pressure sensors 14 data representative of the actual distribution of pressure on the load bearing surface. This data is processed by the processor 40 and, in response to this data, the processor 40 output signals on the lines 42 to control the motors 28. In this manner, the processor 40 controls the shape of the load bearing surface 12. In particular, the processor 40 controls the shape of the load bearing surface 12 to achieve a desired level of comfort for the user. The algorithm utilized by the processor to change the shape of the load bearing surface is described in detail below.

Figure 2:
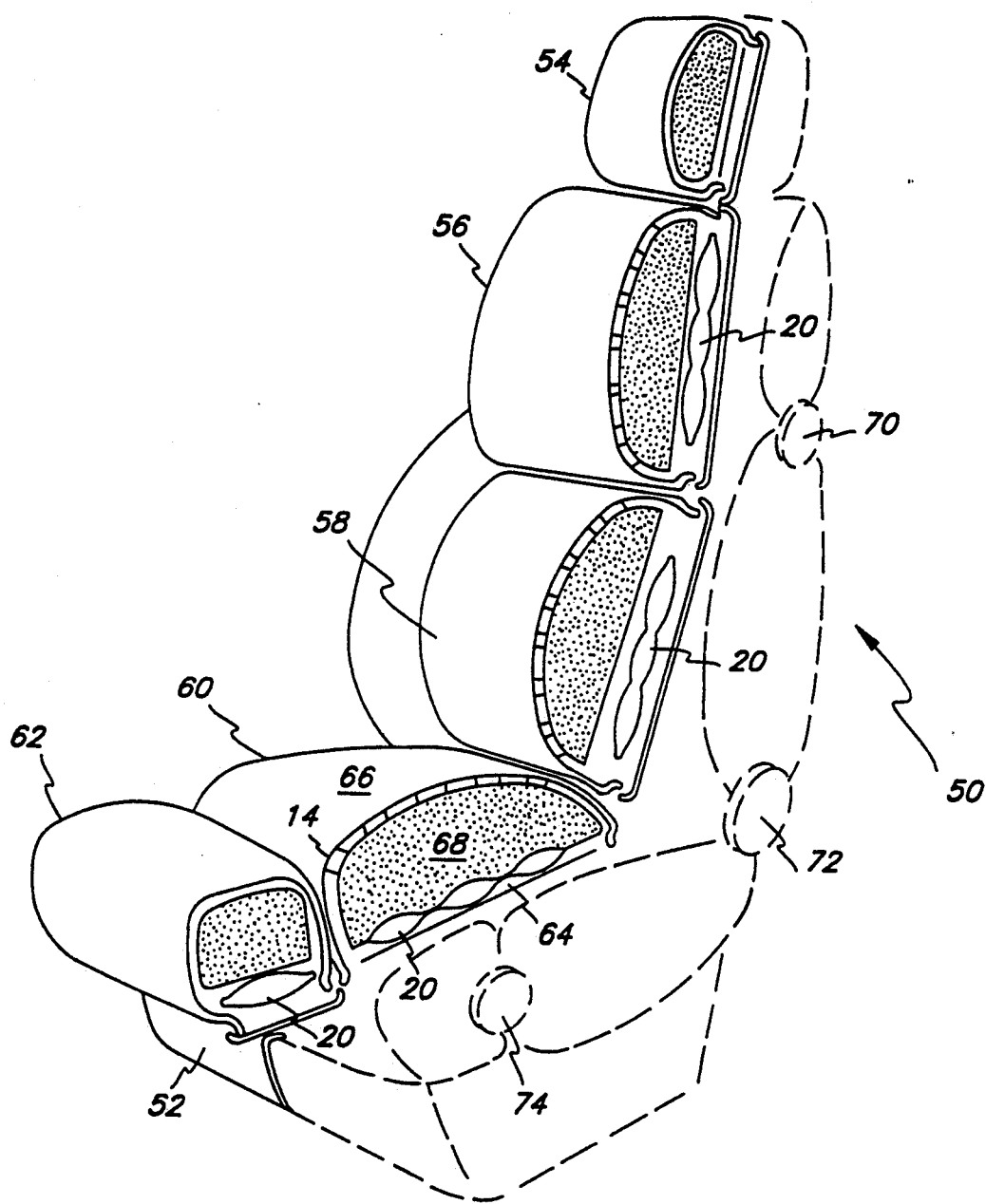
FIG. 2 and FIG. 3 schematically illustrate a load bearing surface in the form of a seat which can be reconfigured in accordance with an illustrative embodiment of the present invention.

FIG. 2 shows a partly perspective and partly cross-sectional view of a seat such as an automobile seat whose shape may be reconfigured in accordance with an illustrative embodiment of the present invention. The chair 50 is supported by a base 52. The chair 50 is divided into a plurality of sections including the headrest 54, the thoracic section 56, the lumbar section 58, the buttocks section 60 and the thigh section 62. Each section such as the buttocks section 60 includes a frame 64 for supporting the section. Each section such as the buttocks section 60 comprises a fabric outer surface 66 which is filled with the foam 68. The various sections 54, 56, 58, 60, 62 are movable with respect to each other through use of the actuators 70, 72, and 74.

To implement the present invention, an array of pressure sensors 14 is embedded under the fabric surface for the thoracic, lumbar, buttocks, and thigh sections. In addition, the thoracic, lumbar, buttocks and thigh sections of the chair 50 include the bladders 20 which are illustratively located between the frame 64 and foam 68. In the illustrative embodiment of the invention shown in FIG. 3, no bladders or pressure sensors are included in the headrest 54, although in other embodiments such bladders and pressure sensors may be incorporated.

Figure 3:
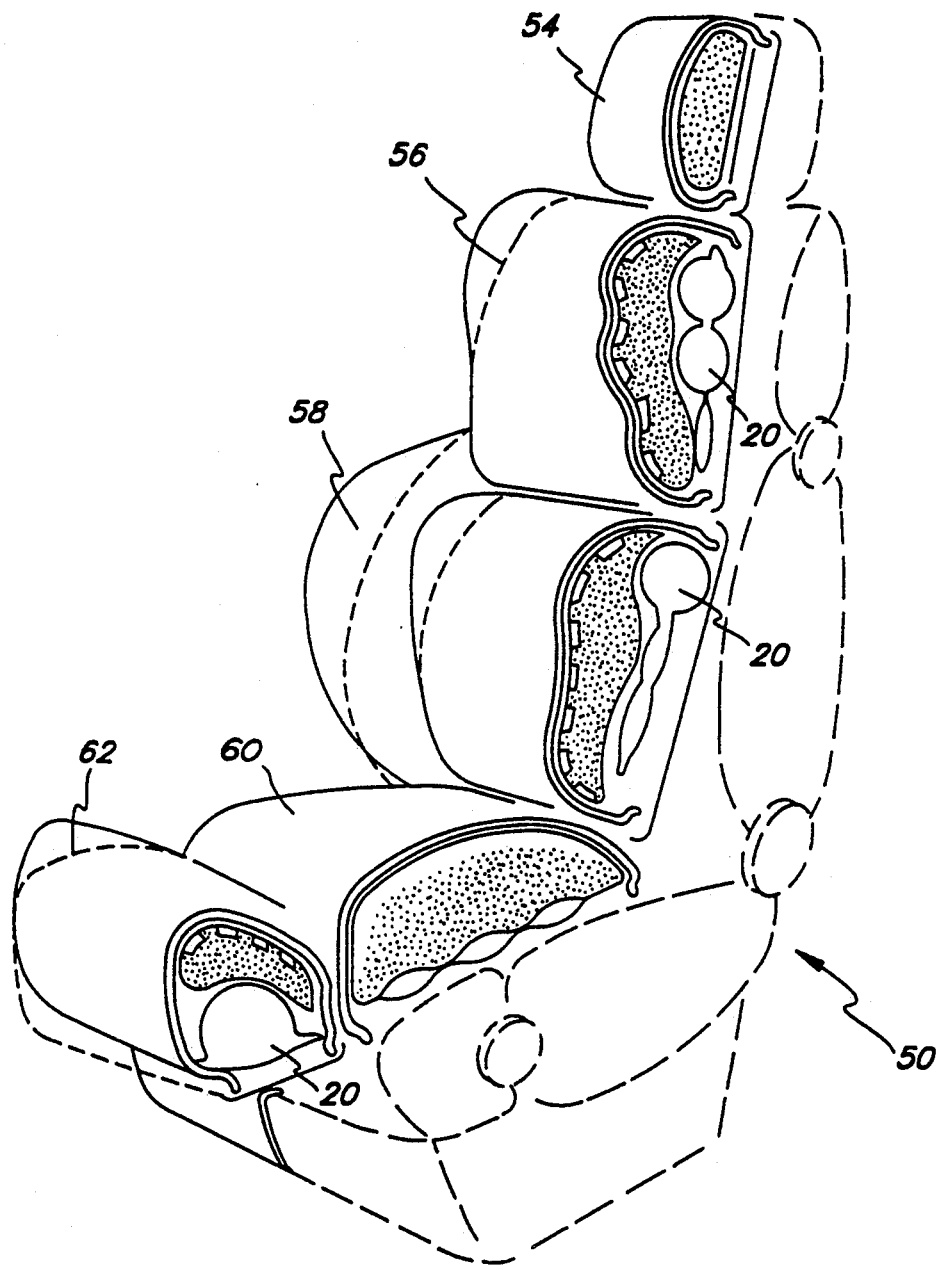

By using the feedback system described above in connection with FIG. 1, air can be added or removed from the bladders 20 to change the shape of the load bearing surface formed by the seat 50. FIG. 3 shows how air has been added to some of the bladders 20 in the thoracic, lumbar and thigh regions to change the shape of these regions.

Figure 4:
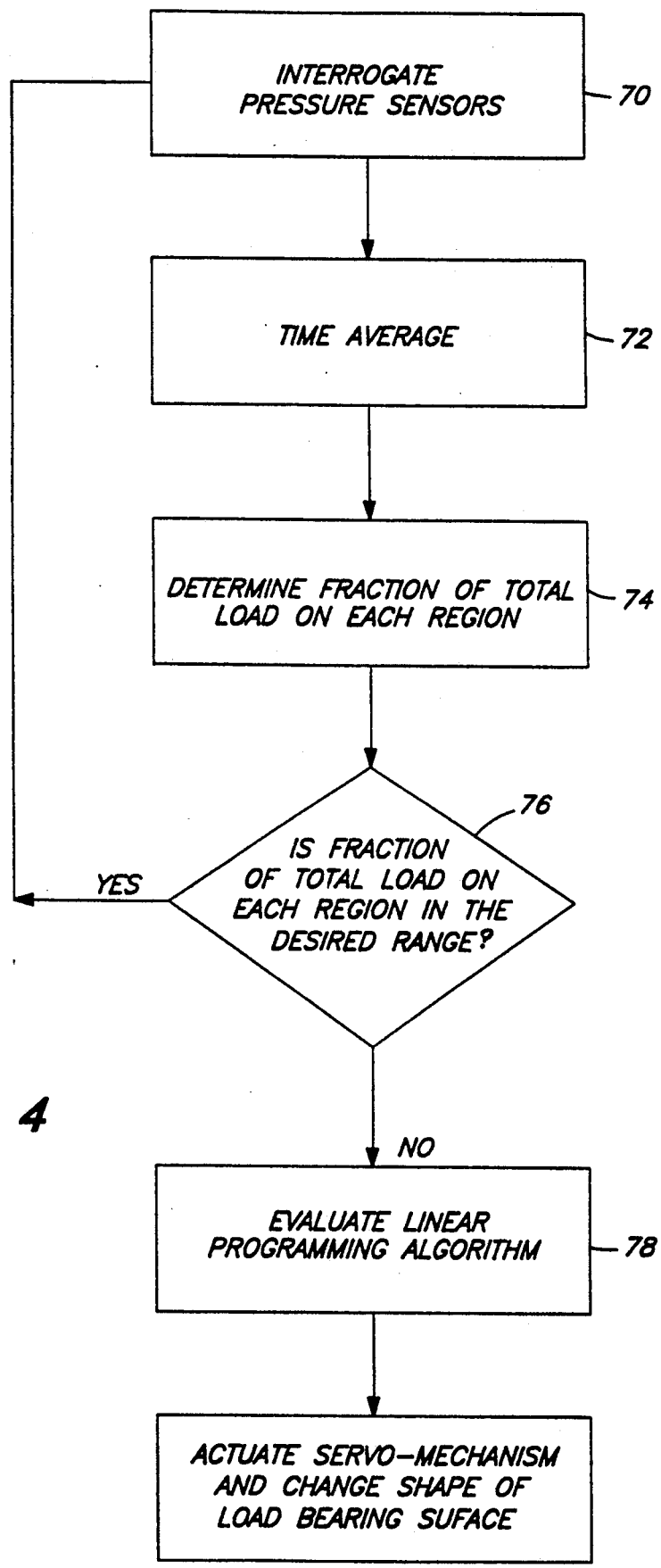
FIG. 4 is a flow chart which schematically illustrates an algorithm carried out by a processor in the system of FIG. 1.

An illustrative algorithm utilized by the processor 40 of FIG. 1 to control the shape of a load bearing surface is illustrated by the flow chart of FIG. 4. Thus, as shown in FIG. 4, the first step of the load bearing surface shape-changing process is to interrogate the pressure sensors 14 (box 70 of FIG. 4) to obtain data representative of the actual distribution of pressure exerted by a user on a load bearing surface. Since the shape reconfiguration mechanism operates continuously, this data is time averaged (box 72 of FIG. 4) to avoid changing the shape of the load bearing surface for each small movement by the user. Rather, the shape of the load bearing surface is preferably changed only in response to larger, longer term movement of the user.

The processor 40 determines the fraction of total load exerted on each of a plurality of regions of the load bearing surface (box 74 of FIG. 4). The processor then determines if the fraction of total load exerted on each region is within a desired range (box 76 of FIG. 4). If the fraction of the total load in each region is within the desired range no action is taken. If the fraction of total load in each region is not within the desired range, a linear programming algorithm (box 78 of FIG. 4) is executed to determine how to change the shape of the load bearing surface so that the fraction of total load exerted on each region is within the desired range. Once this is done the servo-mechanism such as the motors 28 of FIG. 1 are activated to change the shape of the load bearing surface. Since a feedback system is utilized, after the change in shape of the load bearing surface, the pressure sensors are again interrogated to determine if the fraction of total load in each region is in the desired range and if further changes in shape are necessary for the load bearing surface.

It should be noted that the desired range of load fraction for each region is determined experimentally by using conventional statistical techniques to statistically correlate the comfort of a statistically valid sample of users' with the fraction of total load exerted on each region by these users.

The linear programming algorithm utilized by the processor 40 of FIG. 1 to determine how to change the shape of a load bearing surface in the case of a seat is as follows.

An objective function:

$$\sum_{i=1}^{N} (W_i)(X_i - A_i)(B_i - X_i)$$

is maximized subject to the following constraints $$\sum_{i=1}^{N} X_i = 100$$

$$X_i > A_i > 0$$

$$X_i < B_i > 0$$

where:
$X_i$ = the fraction of total load exerted on seat region i, for i=1 to N
$A_i$ = lower limit of region i load fraction range of a "very comfortable" seat
$B_i$ = upper limit of region i load fraction range of a "very comfortable" seat
$W_i$ = priority (i.e. weighting) factor for region i Illustratively, there are N=16 regions in the seat. In the seat back there are three thoracic regions, three lumbar regions and left and right bolster regions. In the seat pan there are left and right buttocks regions, left and right thigh regions, and four bolster regions.

Instead of using the foregoing algorithm, the processor 40 may evaluate a more complex algorithm. For example, an actual comfort level of a user may be set equal to a linear combination of a variety of attributes of the actual pressure distribution such as the standard deviation of the pressure distribution in particular regions, pressure gradients within or between particular regions, mean gradients in particular regions, maximum gradients in particular regions, median pressure in particular regions, tractions of total load in particular regions and sums of load fractions over several regions. When a linear combination of such attributes of the actual pressure distribution is obtained so as to obtain an actual comfort level of a user, the processor compares the actual comfort level to a desired comfort level range. If the actual comfort level is outside the desired range, the shape of the load bearing surface is altered until the actual comfort level is within the desired range.

Figure 5:
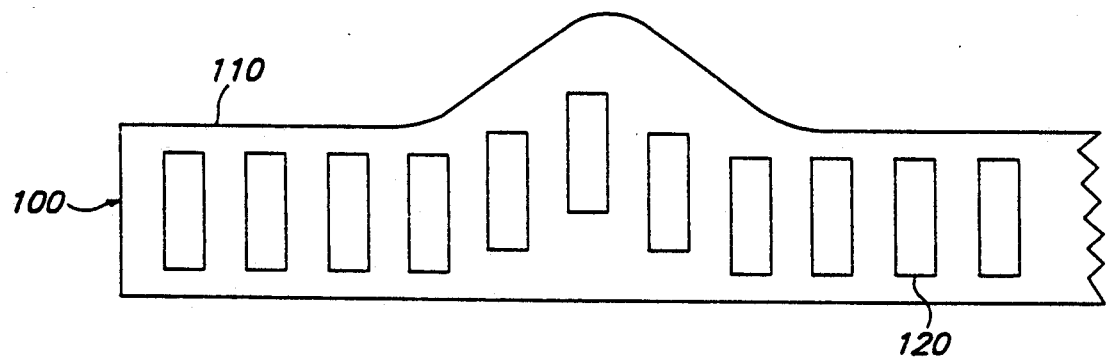
FIG. 5 illustrates an alternative mechanism for reconfiguring a load bearing surface.

As has been indicated above, the shape of a load bearing surface can be changed by varying the quantity of air each of a plurality of air bladders within the surface. However, the shape change may be accomplished in other ways such as hydraulically or through the use of plates contained within the load bearing surface. FIG. 5 shows a cross-section of a load bearing device 100 which has a load bearing surface 110. A plurality of plates 120 in the load bearing device are mounted on motor driven shafts (not shown) and repositioned under the control of a processor to change the shape of the load bearing surface.

Finally, the above-described embodiments of the invention are intended to be illustrative only. Numerous alternative embodiments may be devised by those skilled in the art without departing from the spirit and scope of the following claims.

We claim:

1. An electronic system for adjusting a load bearing surface to provide a desired level of comfort for an individual user comprising pressure sensing means for generating data indicating the actual distribution of pressure exerted by said individual user on said surface, electronic processing means for processing said data generated by said pressure sensing means for determining from said data a time average actual comfort level of said individual user, and for determining if said actual comfort level is a desired comfort level servo-means responsive to said processing means for reconfiguring said load bearing surface until said actual level of comfort is a desired level of comfort for the individual user, said actual comfort level of the individual user being a time average for preventing the load bearing surface from being reconfigured for every small change in position of the individual user.

* * * * *

UNITED STATES PATENT AND TRADEMARK OFFICE
CERTIFICATE OF CORRECTION

PATENT NO.    : 5,283,735
DATED         : February 1, 1994
INVENTOR(S)   : Gross et al.

It is certified that error appears in the above-identified patent and that said Letters Patent is hereby corrected as shown below:

At column 6, line 54, after claim 1 at the end of the patent, add claim 2, as follows:

--2.  An electronic system for adjusting a load bearing surface to provide a desired level of comfort for an individual user comprising:

a sensor apparatus for generating data indicating the actual distribution of pressure exerted by said individual user on said surface, an electronic processor for processing said data generated by said sensor apparatus to determine from said data a time average actual comfort level of said user and for determining if said actual comfort level is a desired comfort level, a servo apparatus responsive to said processor for reconfiguring said load bearing surface until said time average actual comfort level is a desired comfort level, said actual comfort level being a time average for preventing the load bearing surface from being reconfigured for every small change in position of the individual user.--

Signed and Sealed this

Ninth Day of November, 1999

Attest:

*Attesting Officer*

Q. TODD DICKINSON

*Acting Commissioner of Patents and Trademarks*